United States Patent
Daniel

(12) 
(10) Patent No.: US 6,220,968 B1
(45) Date of Patent: Apr. 24, 2001

(54) IRRIGATION DRIVE LINE PROTECTION SYSTEM

(76) Inventor: Jeffrey K. Daniel, 7502 Mesa Rd., Houston, TX (US) 77028

( * ) Notice: Subject to any disclaimer, the term of this patent is extended or adjusted under 35 U.S.C. 154(b) by 0 days.

(21) Appl. No.: 09/248,454

(22) Filed: Feb. 11, 1999

(51) Int. Cl.$^7$ ...................................................... F16C 1/26
(52) U.S. Cl. ........................................... 464/170; 464/177
(58) Field of Search .................................... 464/190, 177; 403/329, 326

(56) References Cited

U.S. PATENT DOCUMENTS

| | | | |
|---|---|---|---|
| 600,375 | * | 3/1898 | Podeyn ................................. 464/170 |
| 2,984,090 | * | 5/1961 | Bennett ................................. 464/170 |
| 4,093,036 | * | 6/1978 | Knutson ............................... 180/337 |
| 4,132,244 | | 1/1979 | Olson et al. . |
| 4,303,203 | | 12/1981 | Avery . |
| 4,340,183 | | 7/1982 | Kegel et al. . |
| 4,365,749 | | 12/1982 | Bowen . |
| 4,435,166 | * | 3/1984 | Bondioli ............................... 464/172 |
| 4,662,563 | | 5/1987 | Wolfe, Jr. . |
| 4,696,660 | * | 9/1987 | Murphy et al. ....................... 464/170 |
| 5,451,001 | | 9/1995 | Kumm . |

* cited by examiner

Primary Examiner—Lynne H. Browne
Assistant Examiner—Aaron Dunwoody

(74) *Attorney, Agent, or Firm*—Bracewell & Patterson, LLP

(57) ABSTRACT

A drive line protection system to shield the drive train of agricultural irrigation systems. The system is comprised of an endcap that attaches to the external face of a gearbox which itself engages the rotating elements of the drive train of an irrigation system. An elongated sleeve or endbell attaches to the endcap and is characterized by a first diameter at its proximal end and a second smaller diameter at its distal end. The proximal end of the endbell is attached to the endcap and extends outwardly along a drive shaft of the drive train. The larger first diameter permits the endbell to encase the coupler or linkage joining the gearbox and the drive shaft. The second diameter of the endbell permits the endbell to be necked down to the approximate diameter of a drive shaft protection tube. The adjustable drive shaft protection tube seats in the distal end of the endbell and extends substantially along the length of the drive shaft. In one embodiment, the endbell is provided with slots for receipt of deflectable locking tabs provided around the perimeter of the endcap wherein the locking tabs securely fasten the endbell in place during operation of the irrigation system but can be deflected as system down times to removal of the cover and access to the drive shaft, linkages and gearbox. The slots also permit drainage of fluid that may collect in the protection system. An input drive shaft protector cap may also be provided to encase the end of the drive shaft protruding from the opposite side of the gearbox.

7 Claims, 5 Drawing Sheets

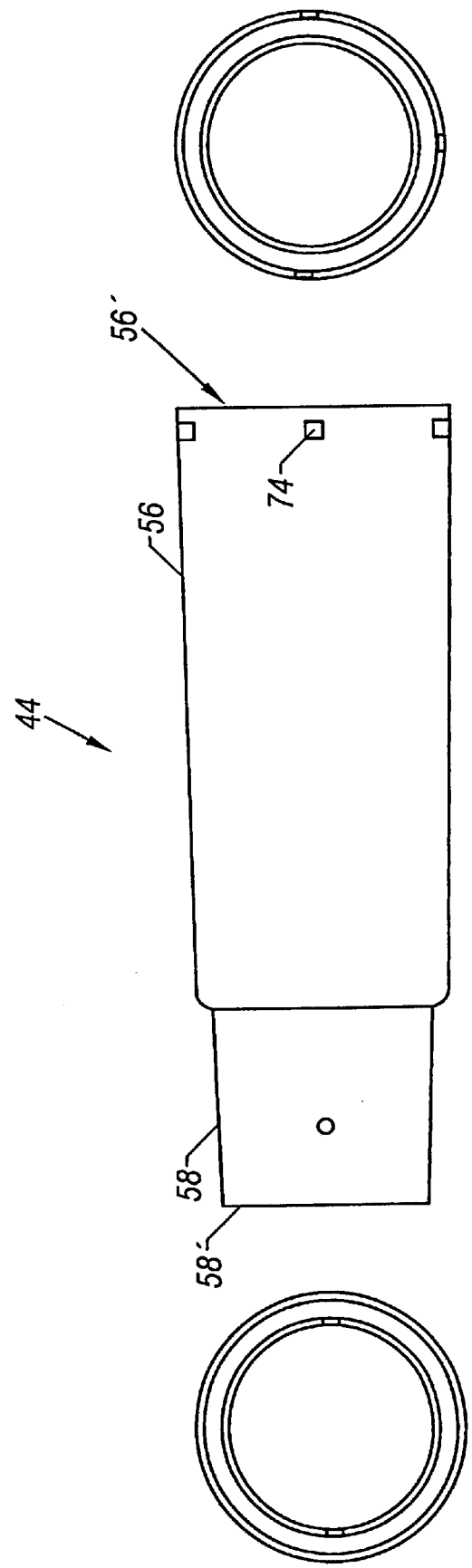

IRRIGATION DRIVE LINE PROTECTION SYSTEM

BACKGROUND OF THE INVENTION

1. Field of the Invention

This invention relates to the field of power transmission gearboxes for use in irrigation equipment, and more particularly to a drive line protection system to shield the irrigation drive train extending from said gearboxes.

2. Description of the Prior Art

Center pivot and linear irrigation systems are becoming increasingly popular to irrigate large sections of land. Typically, such systems are capable of watering a quarter section of land, i.e., 160 acres, or more. A center pivot irrigation system generally comprises an elongated primary irrigation pipe that extends radially outward from a center pivot. When activated, the irrigation pipe rotates around the pivot, thereby watering the area that the irrigation system passes over and resulting in a circular pattern of water coverage about the central pivot point. The length of time involved in a 360 degree rotation of the irrigation pipe may be up to several days. Likewise, linear systems are comprised of similar irrigation pipes, but move linearly across sections of land to be irrigated.

In conventional irrigation systems, the elongated irrigation pipe or span is supported at spaced apart intervals by a plurality of wheeled towers. Extending between each set of adjacent towers is a truss arrangement utilized to support the span and the water deployment system. Sprinklers are located at spaced intervals along the length of the span or a parallel water conduit. The wheels of each tower are normally positioned perpendicular to the span to permit the tower to follow a prescribed path, either circular for center pivot systems or linear for linear systems. Each tower is typically provided with one or more drive motors operable to move the tower in synchronization with the other towers such that the overall length of the span is maintained in substantially a straight line as the irrigation system moves through its prescribed path. In most conventional systems, the drive motors are either electric or hydraulic and referred to as center drive or drive gear motors. In systems using electric motors, each drive motor is typically located midway between the wheels on which the tower is supported. Each wheel is connected to a wheel drive gearbox. To transfer power to each wheel, a drive shaft extends outwardly, substantially parallel with the ground, from the center drive motor to each wheel drive where the drive shaft engages the wheel drive. Typically, the gear shaft will extend through the gearbox and protrude from the opposite side of the gearbox. Since such irrigation systems may take several days to complete a single watering cycle rotation, the output revolutions per minute of the center drive motors and drive shafts are very low, generally in the range of 28–86 rpm depending on the center drive type.

One drawback to the above-described prior art arrangement is that rotating elements of the drive train, such as the drive shafts, are either exposed or covered with a rigid conduit that rotates along with the drive shaft, in each instance creating safety concerns for those persons in proximity to the rotating elements. Another drawback with such systems is that the drive trains are exposed to the environment. Drive trains exposed to agricultural environments may be subject to hazards such as moisture, dirt, insects and temperature extremes, all of which could damage the integrity of the irrigation systems, and in particular, the drive trains of such systems. Particularly vulnerable areas on wheel drives and drive gear motors are the seals adjacent the point where the drive shaft extends from the gearbox. Should the seals become compromised in any way, center drive or wheel drive lubricant could leak from the gearbox resulting in failure of the drive train. One solution has been to loosely place rigid conduit over the drive shaft. Specifically, a plastic conduit having a diameter only slightly larger than the drive shaft is fitted around the drive shaft. An endbell may also be clamped to the conduit to cover larger connecting linkages. In any event, such prior art shields spin freely on the drive shaft or rotate in conjunction with the drive shaft, doing little to protect the drive trains at the open ends of the conduit, especially the gearbox seals. Nor does such a system eliminate the above mentioned safety concerns for persons in proximity to the rotating drive shaft. In fact, use of such conduit results in new drawbacks, since the ends of the conduit adjacent the gearbox tend to wear grooves in the gearbox housing potentially resulting in leakage of gearbox lubricants and exposing the gears to particulate debris that can damage the gearbox.

Still yet another agricultural problem characteristic of such exposed drive shafts is "crop wrap" wherein crops, vegetation and other debris tend to become entwined on or otherwise attached to the rotating elements of the drive train, including the drive shaft, the coupler connecting the drive shaft to input shaft of the wheel drives, and the output shaft of the drive gear motor. The low rpms of the drive train further exacerbate the problem since such debris is more likely to become entwined on slower turning components. Debris wound around the drive train can damage both the seals and the turning components, inhibiting operation of the irrigation system and potentially resulting in gearbox and gear motor failure. In many instances, the irrigation systems are simply placed into service and not routinely examined or checked. As a result, the only time an operator becomes aware of a problem with the irrigation system is after the system has already failed. One solution to crop wrap has been to simply assign personnel to travel out to the irrigation site to periodically remove such debris. However the need to remove such debris may occur as many as several times a day. In that such irrigation systems are otherwise automated and located in remote areas, such a solution is time consuming and expensive. In addition, since the system must be shut down to safely remove such debris, there is a down time associated with such a procedure. Furthermore, use of the prior art shield described above is ineffective since the rotating ends of the drive train remain exposed, permitting debris to migrate into both the shield and the gearboxes.

Notwithstanding these drawbacks, many such irrigation systems are now used on uneven ground, for example, hills or in valleys, where an exposed drive shaft could more easily come into contact with the ground or low growing vegetation resulting in the above described problems. Another problem often encountered in use of irrigation systems is that the wheels of the irrigation systems tend to form ruts or tracks which can extend a considerable depth into the ground, making it more likely that a drive shaft attached to such wheel will be exposed to dirt, vegetation or other debris that could damage the rotating members of the drive train, as well as gearbox and gear motor seals, resulting in interruption of the operation of the irrigation system.

SUMMARY OF THE INVENTION

It is therefore an object of the invention to provide the means and apparatus for drive shaft of center pivot irrigation systems.

It is also an object of the invention to provide a sheath for the drive shafts of center pivot irrigation systems.

It is a further object of the invention to provide a sheath that is fixed relative to the turning drive shaft so that such sheath will not spin on the drive shaft during operation of the system.

It is a further object of the invention to provide a fixed drive shaft sheath that can be easily installed and is easily removed to provide access to the drive shaft, drive shaft couplers and gearbox.

These and other objects are achieved through the drive train protection system of the present invention. The system is comprised of an endcap or gearbox guard that attaches to the external face of a gearbox which itself engages the rotating elements of the drive train of an irrigation system. An elongated sleeve or endbell attaches to the endcap and is characterized by a first diameter at its proximal end and a second smaller diameter at its distal end. The proximal end of the endbell is attached to the endcap and extends outwardly along a drive shaft of the drive train. The larger first diameter permits the endbell to encase the coupler or linkage joining the gearbox and the drive shaft. The second diameter of the endbell permits the endbell to be necked down to the approximate diameter of a drive shaft protection tube. The adjustable drive shaft protection tube seats in the distal end of the endbell and extends substantially along the length of the drive shaft. In one embodiment, the endbell is provided with slots for receipt of deflectable locking tabs provided around the perimeter of the endcap wherein the locking tabs securely fasten the endbell in place during operation of the irrigation system but can be deflected at system down times for removal of the cover and access to the drive shaft, linkages and gearbox. The locking tabs may be provided with sufficient deflection resistance such that a depression tool is necessary to remove the endbell. A shaft protector cap may also be provided to encase the end of the drive shaft protruding from the opposite side of the gearbox.

The above described invention is advantageous over the prior art because it encases the rotating drive shaft in a stationary housing to shield persons from moving parts and to inhibit vegetation or other debris from becoming entwined on the drive train or otherwise damaging the gearboxes and their protective seals, obviating the need for constant attention as is necessary with the prior art devices. In addition, the endcap, endbell and shaft protector cap arrangement shields the linkages and gearbox from various other environmental hazards such as moisture, dirt, insects and temperature extremes that could potentially damage the linkages, seals or other components of the wheel drive and drive gear motor. Further, the system is easily adjustable to accommodate various length drive shafts.

BRIEF DESCRIPTION OF THE DRAWINGS

FIG. 4 is a cut-away side view of the endbell of the invention.

DETAILED DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
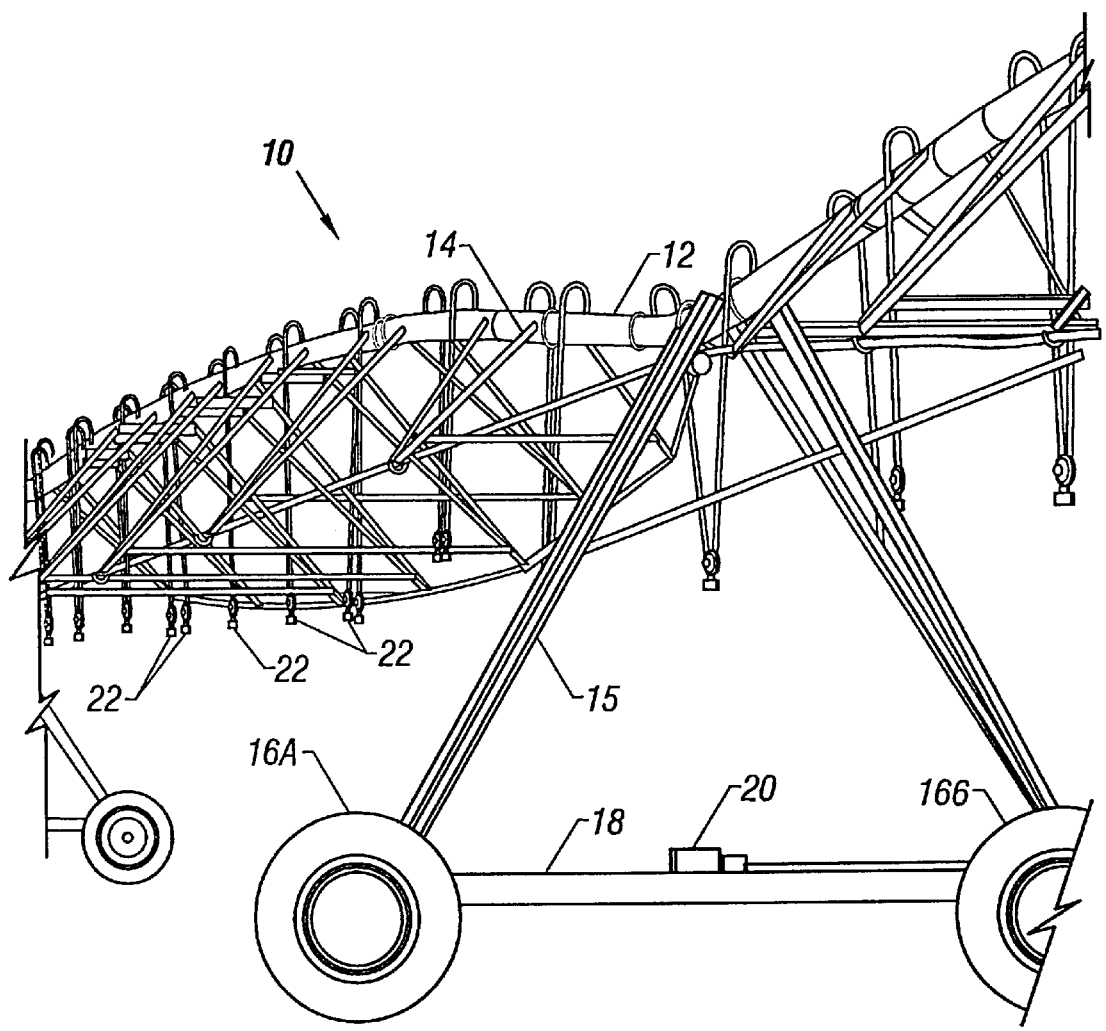
FIG. 1 is an elevation view of a center pivot irrigation span.

Although the protection system of the current will be described in relation to a center pivot irrigation system, those skilled in the art will understand that the invention is also applicable to drive trains used with other irrigation systems, one such nonlimiting example being linear or lateral irrigation systems. With reference to FIG. 1, a center pivot irrigation system of the kind known in the art generally comprises a plurality of individual irrigation sections 10, each of which is characterized by an elongated center pivot or primary span pipe 12, which is centered on a center pivot point (not shown). The irrigation sections 10 are joined successively in a pivoting arrangement so that adjacent sections are capable of pivoting through a range of angles relative to each other. Typically, the individual sections 10 are approximately 120 feet in length and utilize 6 to 10 inch diameter steel pipe as the primary span pipe.

The primary pipe 12 is reinforced using a truss framework 14 and is supported for movement by a plurality of support towers 15. Each support tower 15 includes a first and second wheel 16a, 16b interconnected by a chassis 18 on which is mounted a drive motor 20. Drive motor 20 is utilized to provide forward or reverse movement of the irrigation section 10 about the central pivot point. The primary pipe 12 can either function as the water delivery conduit, as shown in FIG. 1, or can be accompanied by a second pipe that functions as the water delivery conduit. Attached to the water delivery conduit are a plurality of spaced sprinklers 22.

Figure 2:
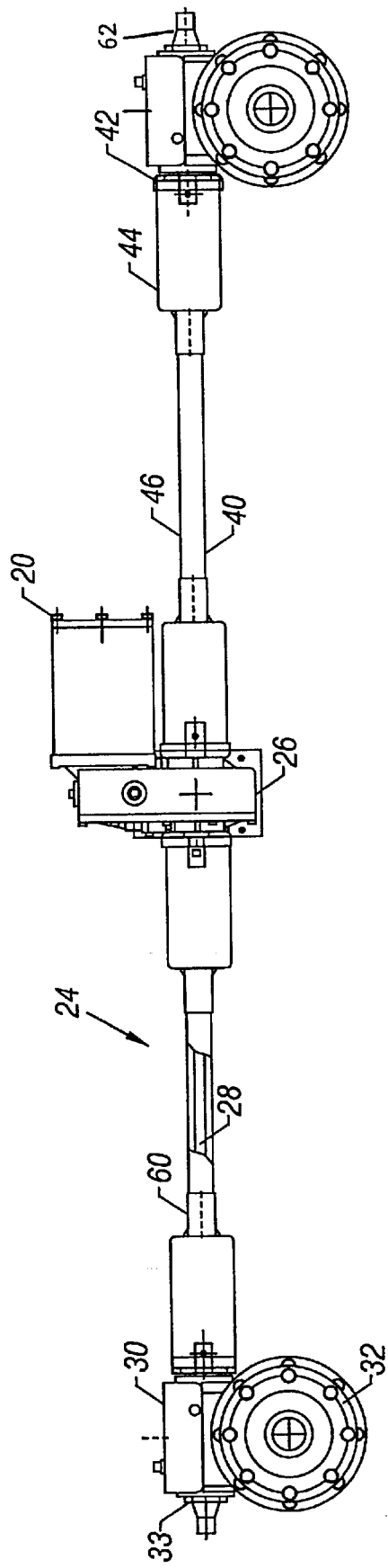
FIG. 2 is an elevation view of the invention installed on the drive line of a center pivot irrigation span.

FIG. 2 more specifically illustrates the drive train 24 for each support tower 15. Specifically, drive train 24, which is supported on chassis 18, includes drive motor 20 which is attached to a primary gearbox 26. Extending from primary gearbox 26 to each wheel 16 is a drive shaft 28. At wheel 16, drive shaft 28 attaches to a wheel drive gearbox 30 which powers wheel hub 32 on which is mounted wheel 16. Typically drive shaft 28 will be attached to wheel drive gearbox 30 via a universal joint or coupler (not shown). In addition, drive shaft 28, either directly or indirectly via a universal joint or coupler, will pass through gearbox 30 and partially extend therefrom as is illustrated at 33.

Attached to drive train 24 is the drive line protection system 40 of the present invention. Drive line protection system 40 is axially aligned with drive shaft 28 between gearboxes 26, 30 and is comprised of an endcap 42 mounted on each gearbox 26, 30. Attached to each endcap 42 is an endbell 44. As is shown, at each point where the drive shaft attaches to a gearbox, the endcap 42 and endbell 44 arrangement is provided. Extending between each endbell, and substantially covering drive shaft 28 is a drive shaft tube 46.

Figure 3B:
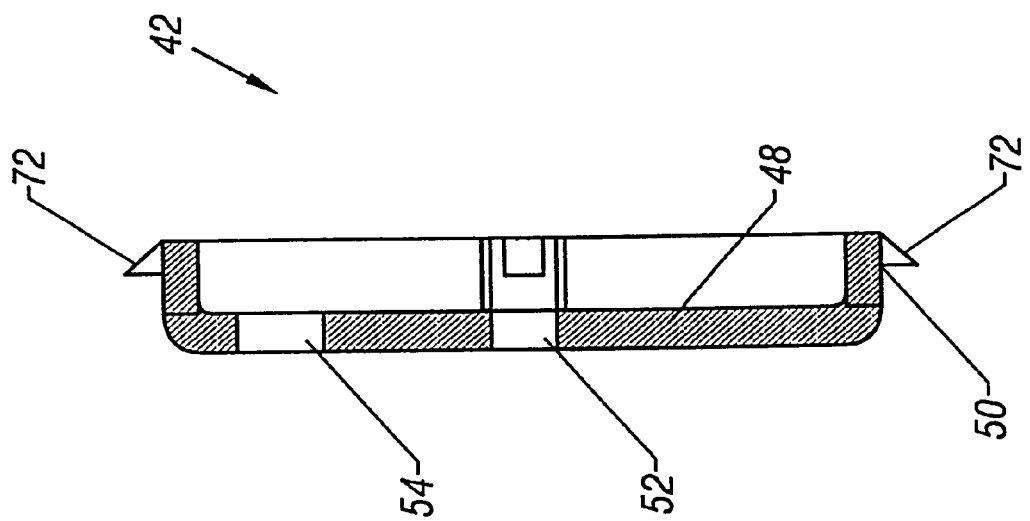
FIG. 3 is a cut-away side view of the endcap of the invention.
Figure 3A:
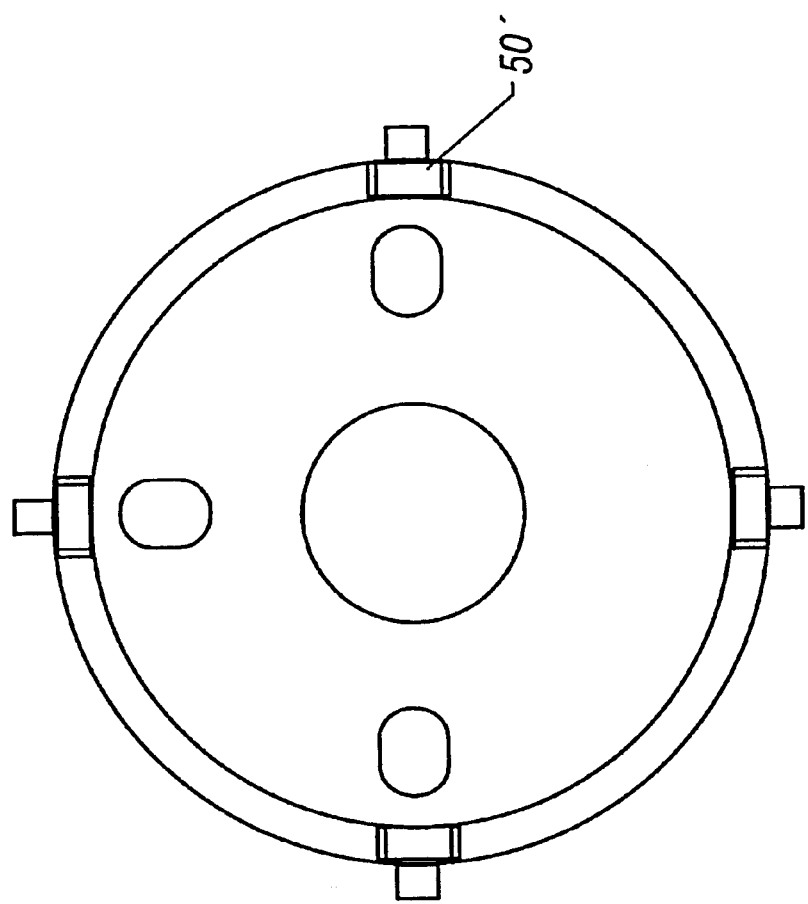
Figure 5B:
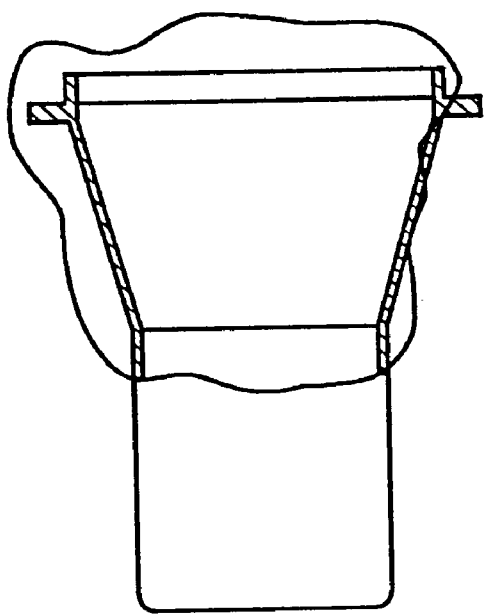
FIG. 5 is a side view of shaft protector of the invention.
Figure 5A:
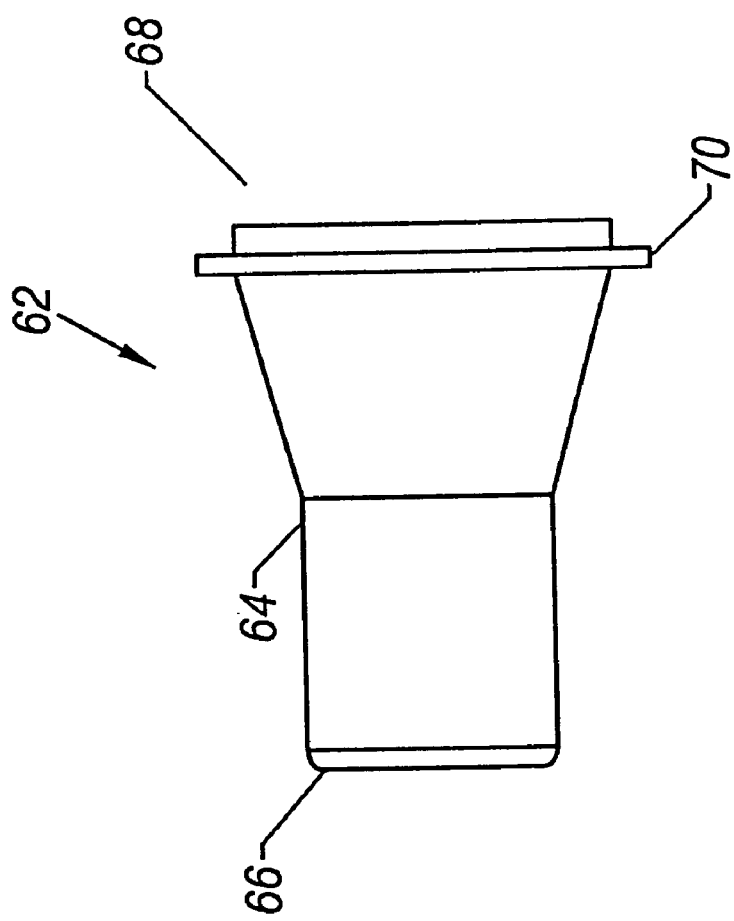

With reference to FIGS. 3, 4, and 5, each endcap 42 is formed of a circular disk 48 having a lip 50 extending around the perimeter of disk 48. A drive shaft hole 52 extends through disk 48. Endcap 42 is mounted on gearbox 26, 30 so that disk 48 is substantially flush with the gearbox, drive shaft 28 extends through drive shaft hole 52 and lip 50 extends outward from the gearbox. In the preferred embodiment, endcap 42 is attached to gearbox 26, 30 using any standard means of attachment. For example, endcap 42 can be bolted to gearbox 26, 30 using bolt holes 54 that may be provided in disk 42.

Endbell 44, which is specifically shown in FIG. 4, is defined by a first sleeve 56 axially aligned with a second sleeve 58, each sleeve having an open end 56', 58', respectively. The diameter of first sleeve 56 is selected to accommodate the diameter of any linkage provided between the gearbox and the drive shaft. Typically, as mentioned above, a universal joint linkage may be provided, wherein the overall diameter of the universal joint is larger than the diameter of the drive shaft. In such case, first sleeve 56 would require a diameter larger than would be necessary to accommodate the smaller diametered drive shaft. Although endbell 44 could be of a single diameter, it is preferable to provide a larger diameter only as necessary to enclose various parts of the drive train. In any event, the open end 56' of first sleeve 56 seats on lip 50 of endcap 42 in order to attach endbell 44 to endcap 42. Those skilled in the art will understand that the diameter of disk 48, and hence the diameter of lip 50, preferably is selected to be larger than the diameter of any such linkage in order to accommodate endbell 44. Whereas first sleeve 56 is utilized to enclose any such linkages and serves as an attachment point to endcap 42, second sleeve 58 is utilized primarily to support a drive shaft tube 60, as shown in FIG. 2 which extends substantially along the length of said drive shaft 28. Specifically, tube 60, the diameter of which is selected permit tube 60 to fit over drive shaft 28, mounts in the open end 58' of endbell 44 and is supported by second sleeve 58. Tube 60 can either be attached or unattached to endbell 44. If attached, any standard means of attachment may be utilized, such as a self-tapping fastener. Although the endcaps and endbells described above are fixed, one desirable feature of the system of the invention is that tube 60 is easily adjustable to accommodate drive trains of varying length by simply selecting a different length tube. Without limitation, endbell 44 may be formed of a single piece of blow molded plastic or any other suitable material using any standard manufacturing process.

In one preferred embodiment, endcap 42 is provided with a plurality of tabs 72 and endbell 44 is provided with a plurality of corresponding notches 74 to permit attachment of endbell 44 to endcap 42. Use of such an arrangement has also been found desirable because notches 74 permit drainage of liquids, such as rainwater, that may have accumulated within the cover system. In another preferred embodiment, "locking" tabs can be utilized, wherein each tab 72 is mounted on a deflectable portion 50' of lip 50 so that endbell 44 can simply be snapped and locked into place by hand by sliding open end 56' over lip 50 until notches 74 align with such locking tabs 72. In some such embodiments, a tool or similar device may be utilized to depress the locking tabs in order to remove endbell 44 and to permit access to endcap 42, the gearbox, and any adjacent linkages. Those skilled in the art will understand that any other suitable attachment arrangement may be utilized to securely fasten endbell 44 to endcap 42 without departing from the invention.

In the drive line protection system 24 of the current invention, input shaft protector cap 62 is utilized to cover the portion of the drive shaft 28 extending from the opposite side of a wheel drive gearbox as shown at 33. In FIG. 5, input shaft protector cap 62 is an elongated cylinder 64 having a closed end 66 and an open end 68. The diameter of cylinder 64 may vary between closed end 66 and open end 68 as necessary to accommodate the diameter of the input drive shaft. As is shown, a lip 70 or similar feature may be provided around the perimeter of open end 68 to permit attachment of input shaft protector cap 62 to a wheel drive gearbox. Preferably, a wheel drive gearbox is provided with a corresponding groove in which lip 70 can seat.

Although the drive line protection system of the current invention need not fully enclose the drive shaft to accomplish many of the stated objectives, those skilled in the art will understand the benefits to a fully enclosed arrangement. In any event, the above described system will inhibit vegetation or other debris from damaging gearbox and gear motor seals or otherwise becoming entangled on the exposed portions of the drive train of various agricultural and industrial equipment. Furthermore, the system inhibits migration of such debris into connecting linages, seals or gearboxes utilized in the drive train of such equipment. Those skilled in the art will understand that although the protection system has been specifically described for use with center pivot irrigation systems, the protection system is also suitable for other equipment in which an exposed drive train is utilized. The system is also desirable as a safety device, covering drive trains that could otherwise be hazardous.

While certain features and embodiments of the invention have been described in detail herein, it will be readily understood that the invention encompasses all modifications and enhancements within the scope and spirit of the following claims.

What is claimed is:

1. A drive shaft protection cover for at least partially enclosing a drive shaft extending from a gearbox of a wheel supported tower of an agricultural irrigation system, the cover comprising:

an endcap formed of a circular disk having a lip extending from the perimeter of said disk, said disk defining an aperture therethrough, wherein said endcap is rigidly attached to the gearbox such that the drive shaft extends through said aperture and said lip extends outward from said gearbox along said the drive shaft; and an endbell, said endbell having a first sleeve axially aligned with a second sleeve, each sleeve having an open end, wherein the open end of said first sleeve is disposed to engage the lip of said endcap such that said endbell extends along outward from said endcap.

2. A drive shaft protection cover for at least partially enclosing a drive shaft extending from a gearbox of a wheel supported tower of an agricultural irrigation in system, the cover comprising:

an endcap formed of a circular disk having a lip extending from the perimeter of said disk, said disk defining an aperture therethrough, wherein said endcap is rigidly attaches to the gearbox such that the drive shaft extends through said aperture and said lip extends outward from said gearbox along said the drive shaft;

an endbell, said endbell having a first sleeve axially aligned with a second sleeve, each sleeve having an open end, wherein the open end of said first sleeve is disposed to engage the lip of said endcap such that said endbell extends along the drive shaft outward from said endcap;

a drive shaft tube, said drive shaft tube mounting in the open end of said second sleeve, wherein said drive shaft tube extends substantially along the length of said drive shaft.

3. The cover of claim 2, wherein said first sleeve has a first diameter and said second sleeve has a second diameter and wherein the first diameter is larger than the second diameter.

4. The cover of claim 2, wherein said endcap is further provided with at least one tab and said first sleeve is provided with at least one notch for receipt of said tab, and wherein said tab seats in said notch to fixedly attached said endbell to said endcap.

5. The cover of claim 4 wherein said tab is mounted on a deflectable portion of said lip to permit the tab to lock its respective notch.

6. The cover of claim 5 wherein said endcap is provided with at least four locking tabs and said first sleeve is provided with at least four complimentary notches.

7. A drive shaft protection cover system for at least partially enclosing a drive shaft extending between adjacent gearboxes of a wheel supported tower of an agricultural irrigation system, the cover system comprising:

first and second endcaps, each endcap formed of a circular disk having a lip extending from the perimeter of said disk, said disk defining an aperture therethrough, wherein each endcap is rigidly attached to an opposing gearbox such that the drive shaft extends through said apertures and the lip of each endcap extends outward from its respective gearbox along said the drive shaft;

first and second endbells, each endbell having a first sleeve axially aligned with a second sleeve, each sleeve of each endbell having an open end, wherein the open end of said first sleeve is disposed to engage the lip of an endcap such that said endbell extends along the drive shaft outward from said endcap, and wherein the ends of the opposing second sleeves open toward each other;

a drive shaft tube, said drive shaft tube mounting in and extending between the open ends of said second sleeves.

* * * * *